United States Patent
Lindell

(10) Patent No.: US 11,643,956 B2
(45) Date of Patent: May 9, 2023

(54) METHOD AND SYSTEM DETERMINING A REFERENCE VALUE IN REGARD OF EXHAUST EMISSIONS

(71) Applicant: Scania CV AB, Södertälje (SE)

(72) Inventor: Martin Lindell, Nynäshamn (SE)

(73) Assignee: Scania CV AB, Södertälje (SE)

( * ) Notice: Subject to any disclaimer, the term of this patent is extended or adjusted under 35 U.S.C. 154(b) by 0 days.

(21) Appl. No.: 15/733,928

(22) PCT Filed: Jun. 4, 2019

(86) PCT No.: PCT/SE2019/050517
§ 371 (c)(1),
(2) Date: Dec. 1, 2020

(87) PCT Pub. No.: WO2019/240651
PCT Pub. Date: Dec. 19, 2019

(65) Prior Publication Data
US 2021/0222597 A1 Jul. 22, 2021

(30) Foreign Application Priority Data

Jun. 11, 2018 (SE) .................................. 1850705-3

(51) Int. Cl.
*F01N 3/20* (2006.01)
*F01N 11/00* (2006.01)
(Continued)

(52) U.S. Cl.
CPC .............. *F01N 3/208* (2013.01); *F01N 11/00* (2013.01); *F01N 3/021* (2013.01); *F01N 3/0842* (2013.01);
(Continued)

(58) Field of Classification Search
CPC ............... F01N 11/00; F01N 2560/026; F01N 2560/12; F01N 2610/02; F01N 2900/0418;
(Continued)

(56) References Cited

U.S. PATENT DOCUMENTS 5,729,971 A 3/1998 Matsuno et al. ................. 60/277
5,822,979 A 10/1998 Hamburg et al. ............... 60/274
(Continued)

FOREIGN PATENT DOCUMENTS

CN 1702308 A 11/2005
CN 102791996 A 11/2012
(Continued)

OTHER PUBLICATIONS

Chinese Office Action, dated Oct. 29, 2021, issued in Chinese Patent Application No. 201980037829.X. Included English translation. Total 15 pages.
(Continued)

*Primary Examiner* — Phutthiwat Wongwian
*Assistant Examiner* — Diem T Tran
(74) *Attorney, Agent, or Firm* — Banner & Witcoff, Ltd.

(57) ABSTRACT

A method for determining a reference value of a presence of at least one substance ($NO_x$) occurring in an exhaust gas stream of an internal combustion engine (101), wherein the at least one substance is subjected to exhaust treatment, the exhaust treatment being carried out in dependence on the reference value ($Em_{ref}$; $Em_{ref,1}$; $Em_{ref,2}$) When the internal combustion engine (101) is started: accumulating the occurrence ($Em_{ACC,1}$; $Em_{ACC,2}$) of the at least one substance ($NO_x$) downstream from the exhaust treatment during a first period, and determining whether to redetermine the refer-
(Continued)

ence value ($Em_{ref}$; $Em_{ref,1}$; $Em_{ref,2}$) based on the accumulated occurrence ($Em_{ACC,1}$; $Em_{ACC,2}$) of the at least one substance ($NO_x$).

12 Claims, 5 Drawing Sheets

(51) Int. Cl.
 *F01N 3/021* (2006.01)
 *F01N 3/08* (2006.01)
(52) U.S. Cl.
 CPC .... *F01N 2560/026* (2013.01); *F01N 2560/12* (2013.01); *F01N 2610/02* (2013.01); *F01N 2900/1404* (2013.01)
(58) Field of Classification Search
 CPC ..... F01N 2900/1402; F01N 2900/1404; F01N 3/021; F01N 3/0842; F01N 3/2066; F01N 3/208; Y02A 50/20; Y02T 10/12; Y02T 10/40
 See application file for complete search history.

(56) References Cited

U.S. PATENT DOCUMENTS

| | | | |
|---|---|---|---|
| 6,532,793 | B1 | 3/2003 | Palocz-Andresen ......... 73/23.31 |
| 2013/0024089 | A1 | 1/2013 | Wang et al. ................... 701/102 |
| 2017/0248091 | A1 | 8/2017 | Segtrop et al. |
| 2017/0268398 | A1* | 9/2017 | Han ...................... F01N 3/2066 |

FOREIGN PATENT DOCUMENTS

| | | |
|---|---|---|
| CN | 103080494 A | 5/2013 |
| DE | 10 2015 122 784 B3 | 9/2016 |
| EP | 2 5 74 763 A1 | 4/2013 |
| EP | 2 574 763 A1 | 4/2013 |
| KR | 20160102648 A | 8/2016 |
| WO | WO 2012/045604 A1 | 4/2012 |
| WO | WO 2014/189528 A1 | 11/2014 |

OTHER PUBLICATIONS

Novelty Search Report dated Sep. 6, 2017.
Office Action dated Nov. 23, 2018 in corresponding Swedish Patent Application No. 1850705-3.
International Search Report dated Jun. 27, 2019 in corresponding PCT International Application No. PCT/SE2019/050517.
Written Opinion dated Jun. 27, 2019 in corresponding PCT International Application No. PCT/SE2019/050517.
J.M. Luján et al., "An assessment of the real-world driving gaseous emissions from a Euro 6 light-duty diesel vehicle using aportable emissions measurement system (PEMS)," Atmospheric Environment, 174:112-121 (2018).
M.S. Reiter et al., "The problem of cold starts: A closer look at mobile source emissions levels," Transportation Research Part D: Transport and Environment, 43:123-132 (2016).
Feb. 10, 2022—(EP) Extended Search Report—App. No. 19819762.6.
Aug. 9, 2022—(BR) Unfavorable Opinion—App. No. BR 112020024725-1.
J.M. Lujáan et al., "An assessment of the real-world driving gaseous emissions from a Euro 6 light-duty diesel vehicle using a portable emissions measurement system (PEMS)," Atmospheric Environment, 174:112-121 (2018).

* cited by examiner

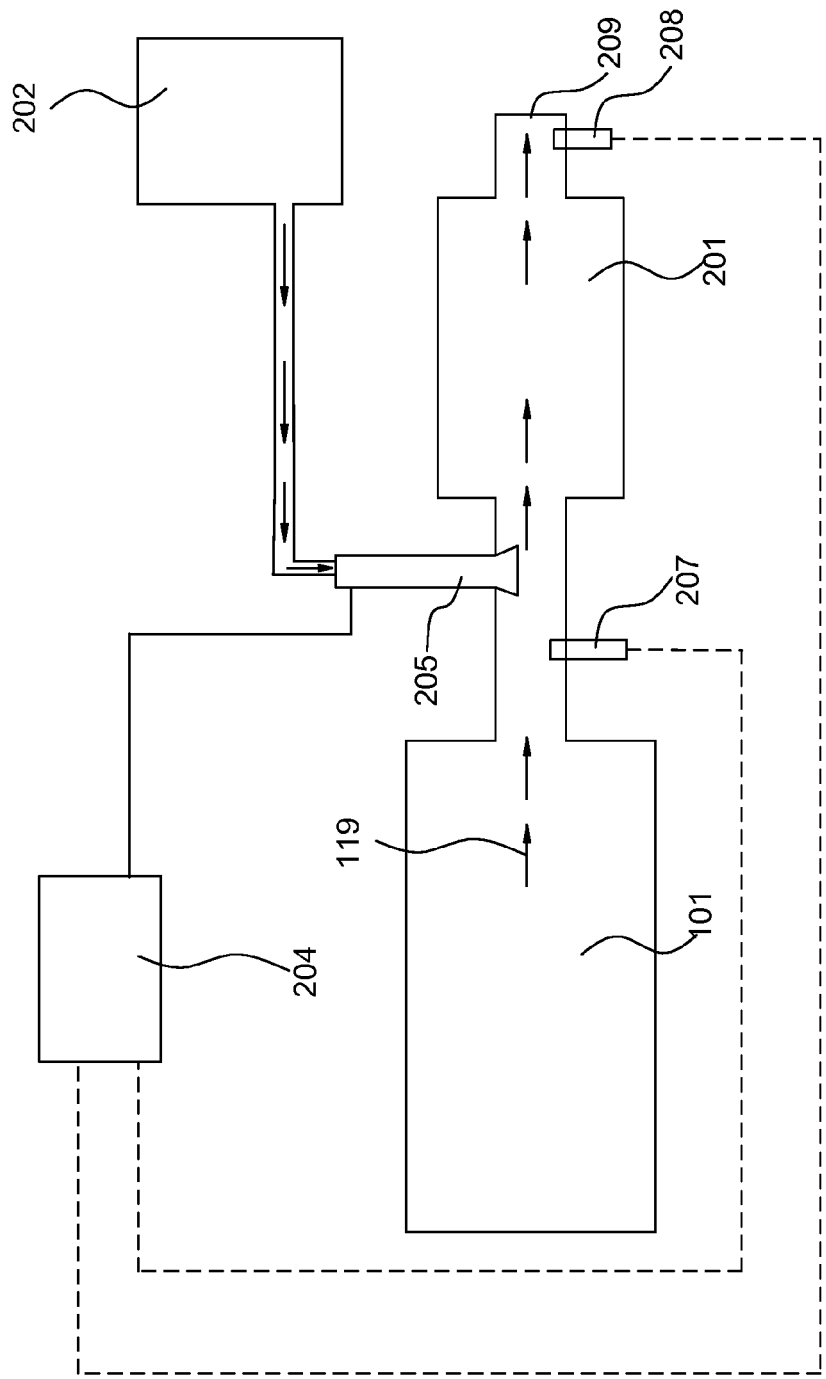

METHOD AND SYSTEM DETERMINING A REFERENCE VALUE IN REGARD OF EXHAUST EMISSIONS

CROSS-REFERENCE TO RELATED APPLICATIONS

The present application is a 35 U.S.C. §§ 371 national phase conversion of PCT/SE2019/050517, filed Jun. 4, 2019, the contents of which are incorporated herein by reference which claims priority of Swedish Patent Application No. 1850705-3, filed Jun. 11, 2018, the contents of which are incorporated by reference herein. The PCT International Application was published in the English language.

FIELD OF THE INVENTION

The present invention relates to combustion processes, and in particular to methods and systems for determining a reference value in regard of exhaust treatment in an exhaust aftertreatment system. The present invention also relates to a vehicle, as well as a computer program and a computer program product that implement the method according to the invention.

BACKGROUND OF THE INVENTION

With regard to vehicles in general, and at least to some extent heavy/commercial vehicles such as trucks, buses and the like, there is constantly ongoing research and development with regard to increasing fuel efficiency and reducing exhaust emissions.

This is often at least partly due to growing governmental concern about pollution and air quality, e.g. in urban areas, which has also led to the adoption of various emission standards and rules in many jurisdictions.

These emission standards often consist of requirements that define acceptable limits for exhaust emissions of vehicles provided with internal combustion engines. For example, the exhaust levels of e.g. nitrogen oxides ($NO_x$), hydrocarbons (HC), carbon monoxide (CO) and particles are regulated for most kinds of vehicles in these emission standards.

The undesired emission of substances can be reduced, for example, by reducing fuel consumption and/or through the use of exhaust treatment/aftertreatment (purifying) of the exhaust gases that results from the combustion process.

Exhaust gases from the internal combustion engine can, for example, be treated through the use of one or more catalytic processes. There exist various kinds of catalytic converters, where different types can be used for different kinds of fuel and/or for treatment of different kinds of substances occurring in the exhaust gas stream. With regard to at least nitrogen oxides $NO_x$ (such as nitric oxide NO and nitrogen dioxide $NO_2$), heavy vehicles often perform a method where an additive is supplied to the exhaust gas stream. The additive is supplied, usually through the use of a catalytic converter, in order to reduce the presence of nitrogen oxides $NO_x$ to less pollutive substances (mainly nitrogen and water vapor). The supply of additive in regard to reduction of nitrogen oxides $NO_x$ or any other substance occurring in the exhaust gas stream, is in general controlled on the basis of a reference value that e.g. may define the maximum emission levels that are discharged to the vehicle surroundings following the reduction that is being carried out in the one or more catalytic converters. The reference value may e.g. be stated in terms of quantities of resulting emissions leaving the vehicle per amount of work produced by the internal combustion engine.

The additive may be injected into the exhaust gas stream which results from combustion in the internal combustion engine upstream of the catalytic converter. One exemplary type of catalytic converter that is used in nitrogen oxide $NO_x$ reduction of this kind is Selective Catalytic Reduction (SCR) catalytic converters.

Hence, with regard to the supply of additive, this relies at least partly on the reference value such that the supplied amount of additive results in expected exhaust emission levels.

SUMMARY OF THE INVENTION

It is an object of the present invention to provide a method and system for determining a reference value in regard to emissions of at least one substance occurring in the exhaust gas stream, wherein the reference value is determined on the basis of prevailing conditions when the internal combustion engine is started.

According to the present invention, a method is provided for determining a reference value of a presence of at least one substance occurring in an exhaust gas stream of an internal combustion engine, wherein the at least one substance is subjected to exhaust treatment, the exhaust treatment being carried out in dependence on the reference value. The method comprises, when the internal combustion engine is started:

accumulating the occurrence of the at least one substance downstream of the exhaust treatment during a first period, and determining whether to redetermine the reference value based on the accumulated occurrence of the at least one substance.

According to embodiments of the invention the at least one substance is subjected to exhaust treatment by an additive being supplied to the exhaust gas stream for reduction of the at least one substance, wherein the exhaust treatment is carried out in dependence on the reference value by the additive being supplied in dependence on the reference value, and the occurrence of the at least one substance is accumulated downstream of the supply of additive.

According to embodiments of the invention, the at least one substance is subjected to exhaust treatment by exhaust gas recirculation, wherein the exhaust treatment is carried out in dependence on the reference value by the exhaust gas recirculation being controlled in dependence on the reference value, and the occurrence of the at least one substance being accumulated downstream of the recirculation, such as downstream from a point where at least part of the exhaust gases are diverted for recirculation.

With regard to exhaust treatment by supplying additive, the additive, which is supplied for reduction of the at least one substance, may be supplied upstream of at least one catalytic converter, such as a reduction catalytic converter, e.g. a selective catalytic reduction (SCR) catalytic converter. The accumulation of the occurrence of the at least one substance may be an accumulation of the occurrence of the at least one substance downstream of the catalytic converter.

The accumulated occurrence of the at least one substance may be determined at least partly by a sensor which is arranged downstream of the supply of additive, such as downstream of the above mentioned catalytic converter.

As was mentioned above, the presence of at least some substances in an exhaust gas stream resulting from combustion can be reduced through the supply of an additive to the exhaust gas stream. A reagent of the additive then reacts with one or more of the substances occurring in the exhaust gas stream to thereby form less hazardous substances.

The present invention relates to systems where exhaust gases are subjected to exhaust treatment, for example by a supply of additive being used to reduce the concentration of at least one substance, such as, but not limited to, nitrogen oxides $NO_x$, in the exhaust gases resulting from combustion. With regard to such supply of additive, it is important that the reagent is supplied to the exhaust gas stream in a proportion that corresponds to the presence of nitrogen oxides that is to be reduced in order to achieve the resulting remaining portion of the substance being discharged to the surroundings following aftertreatment. This fulfils set criteria regarding a level of emissions.

These substances occurring in an exhaust gas stream and being produced during combustion in an internal combustion engine varies, for example, with the amount of work being produced by the internal combustion engine and with other factors such as internal combustion engine efficiency at the current operating point. Since, e.g. with regard to vehicles, the amount produced by the internal combustion engine may vary to a large extent from one time to another, the emissions being produced may also vary correspondingly.

Still it must be ensured that the exhaust emissions fulfil set requirements. With regard to substances being reduced by the supply of additive, the additive is therefore supplied in correlation with the emissions being produced. In case too low levels of additive are supplied, this may result in insufficient reduction of the substance to be reduced and, conversely, if the amount of additive being supplied is too high in relation to the occurrence of the substance in the exhaust gas stream, this may result in emission of other undesired substances.

The supply of additive may therefore be controlled on the basis of a reference value that stipulates the remaining level of the at least one substance to be reduced following reduction. There is often legislation stipulating maximum allowable emission levels.

The reference value being used in exhaust emission reduction of this kind is in general static, i.e. the same reference value may be used at all times, where the reference value is set such that prevailing requirements are met. The actual supply of additive is then determined based on the occurrence of the at least one substance to be reduced upstream of the supply of additive, where additive is supplied to an extent reducing the occurrence to the maximum limit given by the reference value.

Similar reasoning applies with regard to exhaust gas recirculation, where the amount of exhaust gases being recirculated to reduce at least one substance may be controlled on the basis of a reference value representing the emission of the at least one substance being discharged into the surroundings of the vehicle. This also applies to other systems where the occurrence of a substance is subjected to exhaust treatment on the basis of a reference value.

According to the present invention, it has been realized that it may be beneficial to, instead of utilizing a static reference value, to redetermine, i.e. recalculate, the reference value in some situations.

According to the invention, therefore, a method is provided for determining whether and/or when this is to be performed. According to the invention, emissions of the at least one substance are accumulated during a first period, and following the accumulation, it is determined whether the reference value is to be redetermined based on the accumulation. The accumulation can be used to determine whether the reference value may be recalculated, while still ensuring that the system complies with prevailing emission requirements.

As will be explained below, such redetermination of the reference value may e.g. reduce stress on components to thereby reduce risk of component failure, while simultaneously ensuring that the emission standards to which the system is subjected may be fulfilled.

The accumulation can be arranged to commence within a first period of time from when the internal combustion engine has been started. For example, the accumulation may commence as soon as the internal combustion engine is being started, which may also be the general case. According to embodiments of the invention, the accumulation is started within 5 minutes, or within 3 minutes or within 1 minute from the start of the internal combustion engine. The accumulation allows use of the invention to determine whether the emissions, e.g. due to a prevailing temperature of the internal combustion engine and/or other components, are elevated to an extent where it is determined that the reference value is to be redetermined when the internal combustion engine is started.

When performing a cold start, sensors for measuring e.g. the occurrence of a substance in the exhaust gas stream may not function immediately, e.g. due to cold temperature and/or moisture etc. According to embodiments of the invention, a model representation of the emissions downstream of the reduction catalytic converter is utilized for as long as no reliable measurements may be obtained by a sensor downstream of the reduction catalytic converter.

According to embodiments of the invention, the reference value is redetermined when the accumulated occurrence exceeds a first limit. That is, the accumulated emissions may be compared with a predetermined limit, such as the current reference value. When the accumulated emissions exceed the limit value, a recalculation of the reference value may be performed.

According to embodiments of the invention, it may be determined whether the start of the internal combustion engine fulfils a first criterion when the internal combustion engine is being started, where it is also determined whether to commence and hence perform the accumulation based on whether the start of the internal combustion engine fulfils the first criterion.

For example, the criterion may comprise a criterion which may be used to determine whether the start of the internal combustion engine is to be classified as a cold start or not.

According to embodiments of the invention, when the start of the internal combustion engine is to be classified as a cold start, the reference value may be set to a first predetermined value. In this case, no accumulation is performed to determine whether to redetermine the reference value. In general, with regard to cold starts, emissions are high since both internal combustion engine and exhaust treatment components are cold and not operating at full efficiency. Therefore, it is in general desired to minimize emissions as much as possible. In situations of this kind, a predetermined reference value may be utilized, wherein this predetermined reference value may have been determined through a design and/or manufacturing stage and which may be set such that the requirement according to weighted emissions according to the above are always fulfilled.

The predetermined value may therefore represent a value of the reference value that minimizes the occurrence of the at least one substance downstream the reduction catalytic converter, or at least ensures that emission regulations are fulfilled. As discussed below, cold start emissions and warm start emissions are often weighted to form an aggregate emission value, and the reference value may in this case be set to a predetermined value that fulfils the regulations.

On the other hand, when the first criterion classifies the start as a start being other than a cold start, the accumulation may commence for a determination of whether the reference value is to be redetermined following the accumulation.

According to embodiments of the invention, any suitable criterion may be utilized to determine whether or not the accumulation is to commence.

According to embodiments of the invention, when the internal combustion engine is/about to be started, a representation of a first temperature of the internal combustion engine is determined, and whether to commence the accumulation is determined based on the representation of the first temperature. For example, the engine temperature may be represented by a cooling fluid temperature or an exhaust treatment component temperature.

For example, the accumulation can be commenced when the first temperature exceeds a first temperature limit, i.e. the engine temperature is above some predetermined temperature. This limit may be set to some suitable limit which e.g. may be determined empirically at the time of design and/or manufacture, and/or from experience of earlier installations. The particular level of the temperature may also depend e.g. on whether the temperature is represented by a cooling water temperature or an exhaust treatment component temperature.

According to embodiments of the invention, an ambient temperature is also determined, and whether to commence the accumulation is also determined based on the ambient temperature. For example, the first temperature representing the internal combustion engine can be compared with the ambient temperature, and the accumulation can be arranged to commence when the temperature difference is above a predetermined difference.

The representation of the first temperature may also result from a comparison of a plurality of temperatures, such as e.g. cooling fluid temperature, ambient temperature and exhaust treatment component (e.g. catalytic converter) temperature. The temperatures will converge over time as the internal combustion engine is turned off, and the first temperature may be at a difference between two or more different temperatures. When the difference is e.g. less than a limit of 10 degrees, 20 degrees, 30 degrees or some other suitable temperature difference limit, which e.g. may be determined for the particular combustion engine installation, the start may be classified as a cold start. Conversely, if the difference exceeds the limit, accumulation may be arranged to commence. Furthermore, e.g. temperature sensor tolerances may be taken into account when determining suitable temperature limits.

The first temperature can therefore be used to determine whether the start of the internal combustion engine is to be classified as a cold start or a start being different from a cold start.

With regard to the redetermination of the reference value, this may be determined, calculated, based on the accumulated occurrence of the at least one substance.

For example, the reference value dependency on the accumulated occurrence may be such that a lower reference value results for a first accumulated occurrence in relation to a second accumulated occurrence, which is higher than the first occurrence.

That is, the higher the accumulated emissions, the lower the redetermined reference value.

According to embodiments of the invention, the reference value is redetermined based on the accumulated occurrence of the at least one substance and a target value, where the target value is a limit value which is determined by a weighting of the accumulated occurrence and the reference value.

The target value may be predetermined, and from the relation between target value, reference value and accumulated occurrence, the reference value may be mathematically resolved.

The target value may further be defined such that a higher weight is assigned to the reference value in comparison to the weight of the accumulated occurrence.

With regard to the target value, this may be determined e.g. in relation to legislative limits regarding allowable emissions. For example, the target value may be determined such that there is a margin taking into account e.g. tolerances in sensor accuracy, and sensor sensitivity to still fulfil set requirements.

The target value may, as indicated, be a value that results from weighting the accumulated emissions, which may be accumulated when emissions are high, and emissions when the internal combustion engine and exhaust treatment components are warm and emissions therefore considerably lower. As was also mentioned, when components are warm, the emissions may be given a higher weight, since the vehicle in general is mostly driven when warm.

According to embodiments of the invention, the reference value $Em_{ref}$ is extracted using the following formula, where the target value $Em_{target}$ may be set by legislation and/or vehicle manufacturer, and w1 is the weight given the accumulated emissions.

$$Em_{ref} = \frac{(Em_{target} - w1 * Em_{acc})}{(1 - w1)}$$

The invention may be carried out in a vehicle, and the invention also relates to a system corresponding to the method set forth above. The system is characterized by means carrying out features of the invention. Such means for carrying out features of the invention can consist of any suitable means, and the means can be specifically adapted to perform the features set forth in the system claims. Such means can consist of one or more control units, or other electrical, mechanical and/or electromechanical elements or arrangements.

Further characteristics of the present invention and advantages thereof are indicated in the detailed description of exemplary embodiments set out below and the attached drawings.

BRIEF DESCRIPTION OF THE DRAWINGS

FIG. 2 illustrates an example of an exhaust treatment system where a supply of additive is utilized and with which embodiments of the invention advantageously can be utilized;

DETAILED DESCRIPTION OF EXEMPLARY EMBODIMENTS

In the following detailed description, embodiments of the invention will be exemplified for a vehicle. The invention is, however, applicable also in other kinds of transportation means, such as air and water crafts. The invention is also applicable in fixed installations which are provided with an exhaust aftertreatment where at least one substance is used through the use of additive being supplied to the exhaust gas stream.

Furthermore, the present invention is exemplified below for a urea based additive for reduction of nitrogen oxides. The present invention is, however, applicable for any kind of suitable additive, where the additive can be arranged for reduction of any substance/compound in the exhaust gas stream, and not necessarily nitrogen oxides.

Also, as discussed above, the invention is applicable where e.g. exhaust gases are recirculated on the basis of a reference value representing the emissions leaving e.g. a tail pipe, and any other system where a substance is subjected to exhaust treatment on the basis of a reference value. The following description is applicable for any such system. Also, the exhaust treatment may comprise both supply of additive and exhaust gas recirculation, one or both being controlled based on a reference value.

Further, in the present description and the appended claims the expression "substance" is defined to include chemical compounds as well as mixtures.

Figure 1A:
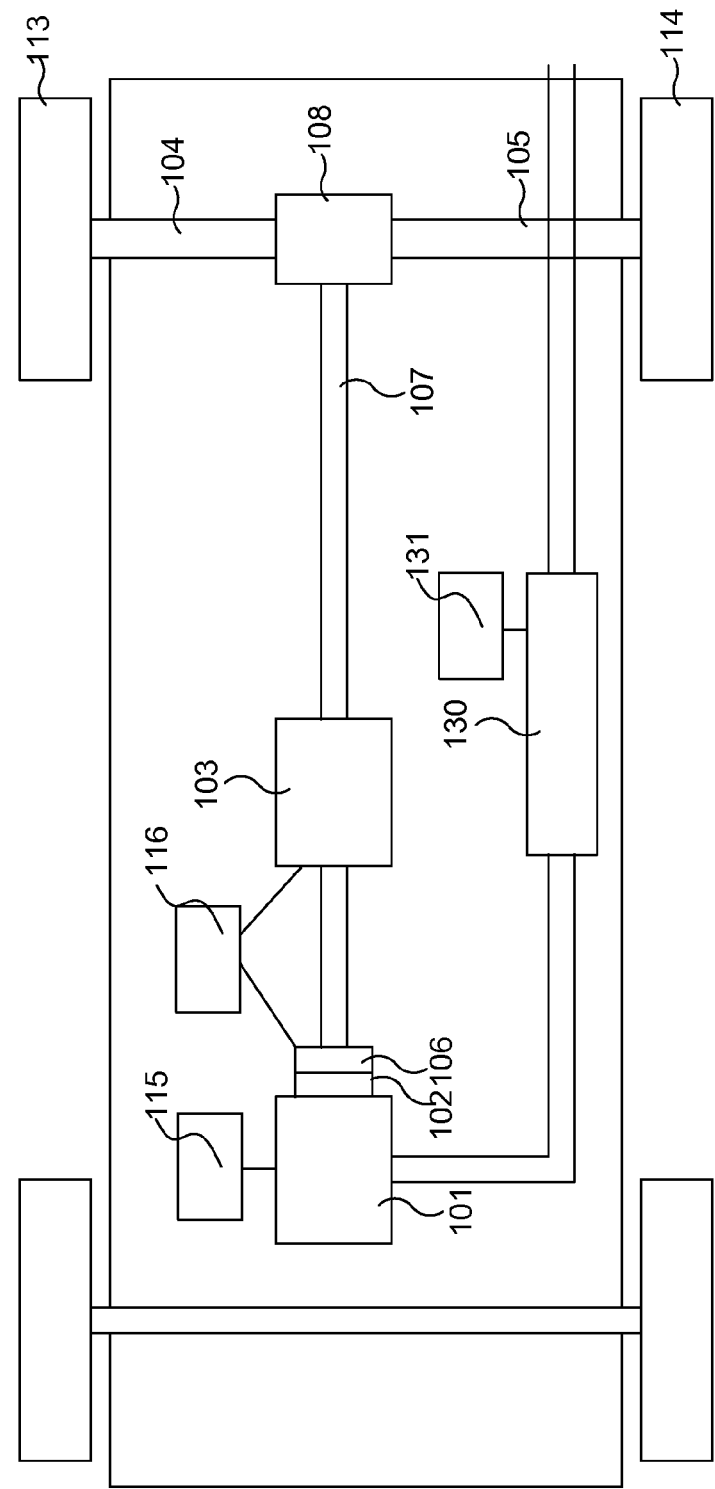
FIG. 1A illustrates a powertrain of an exemplary vehicle in which the present invention advantageously can be utilized.

FIG. 1A schematically depicts a powertrain of an exemplary vehicle 100. The power train comprises a power source, in the present example an internal combustion engine 101, which, in a conventional manner, is connected via an output shaft of the internal combustion engine 101, normally via a flywheel 102, to a gearbox 103 via a clutch 106. An output shaft 107 from the gearbox 103 propels drive wheels 113, 114 via a final gear 108, such as a common differential, and half shafts 104, 105 connected to the final gear 108. The internal combustion engine 101 is controlled by the vehicle control system via a control unit 115, and similarly the clutch and gearbox may be controlled by a control unit 116, which may automatically perform changes of gear.

FIG. 1A, consequently, discloses a powertrain of a specific kind, but the invention is applicable in any kind of powertrain involving an internal combustion engine, and also e.g. in hybrid vehicles. The disclosed vehicle further comprises one or more exhaust treatment components 130 for aftertreatment (purifying) of exhaust gases that results from combustion in the internal combustion engine 101. The functions of the one or more exhaust treatment components 130 are controlled by means of a control unit 131.

The exhaust treatment components 130 may be of various kinds and designs, and according to the disclosed embodiment an additive is supplied to the exhaust gas stream. An example of an exhaust treatment component configuration 130 in which the present invention can be utilized is shown more in detail in FIG. 2.

It is to be noted that exhaust treatment components of the disclosed kind may comprise a plurality of components and be of various designs. For example, the exhaust treatment components 130 may comprise one or more oxidation catalytic converters. Such oxidation catalytic converters may be utilized to oxidize one or several of nitrogen oxides NO and incompletely oxidized carbon compounds in the exhaust stream as is known per se. The exhaust treatment components may also include one or more particulate filters e.g. being arranged downstream of an oxidation catalytic converter and which, in a manner known per se, are arranged to catch and oxidize soot particles. That is, the exhaust gas stream passes through the filter structure of the particulate filter, where soot particles are caught in the filter structure from the passing exhaust stream and are stored and oxidized in the particulate filter.

There exist various configurations comprising one or more oxidation catalytic converters and one or more particle filters and embodiments of the invention may be utilized in any such configuration for as long as the exhaust treatment also comprises the addition of an additive in order to reduce at least one substance occurring in the exhaust gas stream.

However, for the sake of simplicity, such components are not illustrated in FIG. 2 and may instead be present according to embodiments of the invention. In FIG. 2 only a reduction catalytic converter 201 is disclosed. Furthermore, supply of additive, which in FIG. 2 is carried out upstream of the reduction catalytic converter 201, may also be carried out upstream of further components. There may also be more than one reduction catalytic converter, and additive may be provided at more than one location into the exhaust gas stream. Such particular exhaust treatment designs, however, are not the object of the invention which instead relates to the determination of a reference value representing the resulting emissions that are discharged into the surroundings following reduction.

With reference to FIG. 2, in the disclosed exemplary embodiment, aftertreatment of exhaust gases are performed using a selective catalytic reduction (SCR) catalytic converter 201. As was mentioned and as is generally the case, the one or more exhaust treatment components may also comprise further non-disclosed components, for example, further catalytic converters and/or particle filters which can be arranged upstream or downstream of the SCR catalytic converter 201.

Therefore, according to the disclosed example, exhaust gases being generated by the internal combustion engine 101 are configured to pass SCR catalytic converter 201 prior to being discharged into the surroundings of the vehicle 100. The operation of the SCR catalytic converter 201 relies upon the addition of additive, and additive is supplied to the exhaust gas stream upstream of the SCR catalytic converter 201 through the use of a dosing system which is arranged to supply additive to the exhaust stream 119 for use in the SCR catalytic converter 201.

The supply of additive is, according to the present example, used in reduction of the concentration of nitrogen oxides NOx in the exhausts from the internal combustion engine 101 through the use of the SCR catalytic converter 201 prior to emission into the surroundings of the vehicle 100.

This additive can, as in the present example, e.g. be an additive comprising urea as reagent and e.g. consist of AdBlue which constitutes a frequently used additive and which consists of a mixture of approximately 32.5% urea dissolved in water. Urea forms ammonia when heated, and the ammonia then reacts with nitrogen oxides NOx in the exhaust gas stream. The present invention is applicable when using AdBlue, as well as when using any other urea based additive and also when using an additive completely consisting of reagent, such as pure ammonia. As was mentioned above, the invention is also applicable when using any kind of additive comprising or consisting of other reagents, and where any suitable substance in the exhaust gas stream is reduced/treated using the additive.

The additive is supplied using a dosage device, e.g. nozzle, 205 forming part of the additive dosing system, and the additive dosing system further comprises an additive tank 202, which is connected to the injection nozzle 205 via a pump (not shown). The dosing of additive is controlled by an additive control unit 204, which generates control signals for controlling the supply of additive by controlling nozzle 205 and pump so that a desired amount is injected into the exhaust gas stream 119 from the tank 202 using the injection nozzle 205.

Dosing systems for the supply of additive are in general well described in the prior art, and the precise manner in which the supply of additive is dosed/performed is therefore not described in detail herein. In general, the dosing varies, in principle, continuously as the operating conditions of the internal combustion engine changes and thereby the generation, in this example, of nitrogen oxides therewith. Also, an SCR catalytic converter is capable of storing different amounts of ammonia for different prevailing catalytic converter temperatures, as is known per se.

The exhaust conduit may also be equipped with one or several sensors, such as one or more $NO_x$ sensors 207, 208 and/or one or several temperature sensors (not shown) which are utilized for determination of $NO_x$ concentrations and temperatures in the exhaust treatment system 130, respectively. $NO_X$ sensor 207 is arranged upstream of the SCR catalytic converter 201 and may also be arranged upstream e.g. of further exhaust treatment components, such as further catalytic converters, oxidation catalytic converters, particle filters, etc.

The $NO_X$ sensor 208 is arranged downstream of the SCR catalytic converter 201, and provides a measure of the occurrence of nitrogen oxides leaving the vehicle 100 following passage through the exhaust treatment system 130. The $NO_x$ sensor 208 may also be used for feedback regarding dosage of additive and for various other functions such as when performing correction (adaption) of the supply of additive which is not discussed herein but is well known to the person skilled in the art.

As has been discussed, according to the invention, a method is provided for determining a reference value representing the resulting emissions that, in the present example, leaves the vehicle following reduction. An exemplary method 300 according to the invention will be described in the following with reference to FIG. 3.

The method according to the invention can be implemented in any suitable control unit of the vehicle control system. For example, the invention may be implemented at least partly e.g. in the control unit for controlling the one or more aftertreatment components and/or in the control unit for controlling the additive dosing system. As indicated above, the functions of a vehicle are, in general, controlled by a number of control units, and control systems in vehicles of the disclosed kind generally comprise a communication bus system consisting of one or more communication buses for connecting a number of electronic control units (ECUs), or controllers, to various components on board the vehicle. Such a control system may comprise a large number of control units, and the control of a specific function may be divided between two or more of them.

For the sake of simplicity, FIGS. 1A, 2 depicts only control units 115, 116, 130, 204, but vehicles 100 of the illustrated kind are often provided with significantly more control units, as one skilled in the art will appreciate. Control units 115, 116, 130, 204 are arranged to communicate with one another and other components via the communication bus system and other wiring, partly indicated by interconnecting lines in FIG. 1A.

The present invention, as mentioned, can be implemented in any suitable control unit in the vehicle 100, for example in the control unit 131. The supply of additive will usually depend on signals being received from other control units and/or vehicle components, and it is generally the case that control units of the disclosed type are normally adapted to receive sensor signals from various parts of the vehicle 100. The control unit 131 will, for example, receive signals e.g. from one or more of $NO_X$ sensors 207, 208. Control units of the illustrated type are also usually adapted to deliver control signals to various parts and components of the vehicle, e.g. to the engine control unit or control unit 204.

Control of this kind is often accomplished by programmed instructions. The programmed instructions typically consist of a computer program which, when executed in a computer or control unit, causes the computer/control unit to exercise the desired control, such as method steps according to the present invention. The computer program usually constitutes a part of a computer program product, wherein the computer program product comprises a suitable storage medium 121 (see FIG. 1B) with the computer program 126 stored on the storage medium 121. The computer program can be stored in a non-volatile manner on the storage medium. The digital storage medium 121 can, for example, consist of any of the group comprising: ROM (Read-Only Memory), PROM (Programmable Read-Only Memory), EPROM (Erasable PROM), Flash memory, EEPROM (Electrically Erasable PROM), a hard disk unit etc., and be arranged in or in connection with the control unit, whereupon the computer program is executed by the control unit. The behavior of the vehicle in a specific situation can thus be adapted by modifying the instructions of the computer program.

Figure 1B:
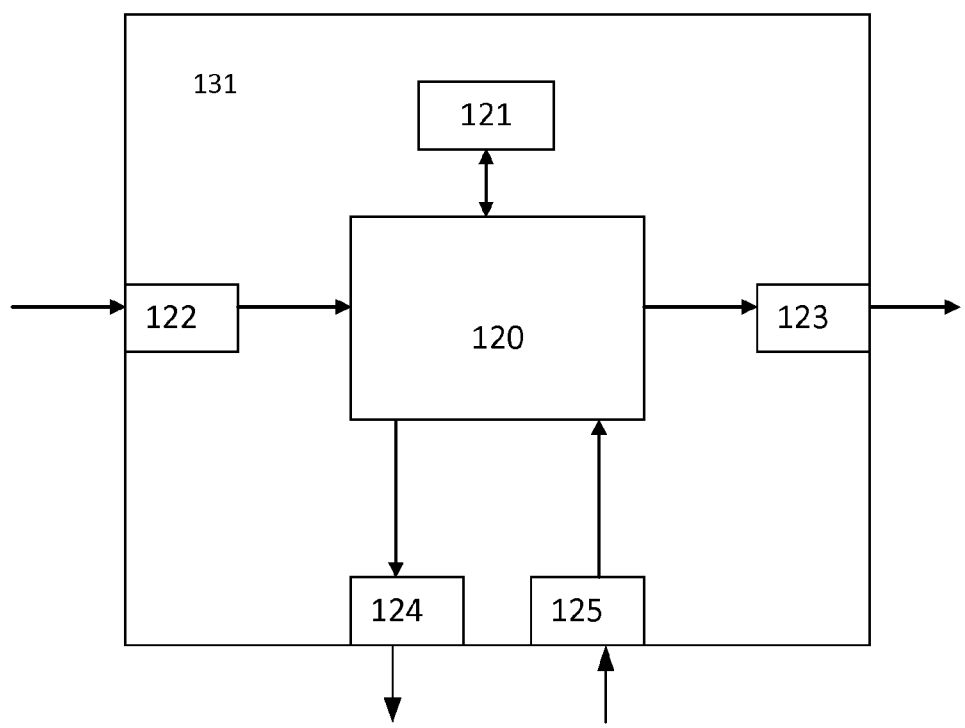
FIG. 1B illustrates an example of a control unit in a vehicle control system.

An exemplary control unit (the control unit 131) is shown schematically in FIG. 1B, wherein the control unit can comprise a processing unit 120, which can consist of, for example, any suitable type of processor or microcomputer, such as a circuit for digital signal processing (Digital Signal Processor, DSP) or a circuit with a predetermined specific function (Application Specific Integrated Circuit, ASIC). The processing unit 120 is connected to a memory unit 121, which provides the processing unit 120, with e.g. the stored program code 126 and/or the stored data that the processing unit 120 requires to be able to perform calculations. The processing unit 120 is also arranged so as to store partial or final results of calculations in the memory unit 121.

Furthermore, the control unit 131 is equipped with devices 122, 123, 124, 125 for receiving and transmitting input and output signals, respectively. These input and output signals can comprise waveforms, pulses or other attributes that the devices 122, 125 for receiving input signals can detect as information for processing by the processing unit 120. The devices 123, 124 for transmitting output signals are arranged so as to convert calculation results from the processing unit 120 into output signals for transfer to other parts of the vehicle control system and/or the component (s) for which the signals are intended. Every one of the connections to the devices for receiving and transmitting respective input and output signals can consist of one or more of a cable, a data bus, such as a CAN bus (Controller Area Network bus), a MOST bus (Media Oriented Systems Transport) or any other bus configuration, or of a wireless connection.

Figure 3:
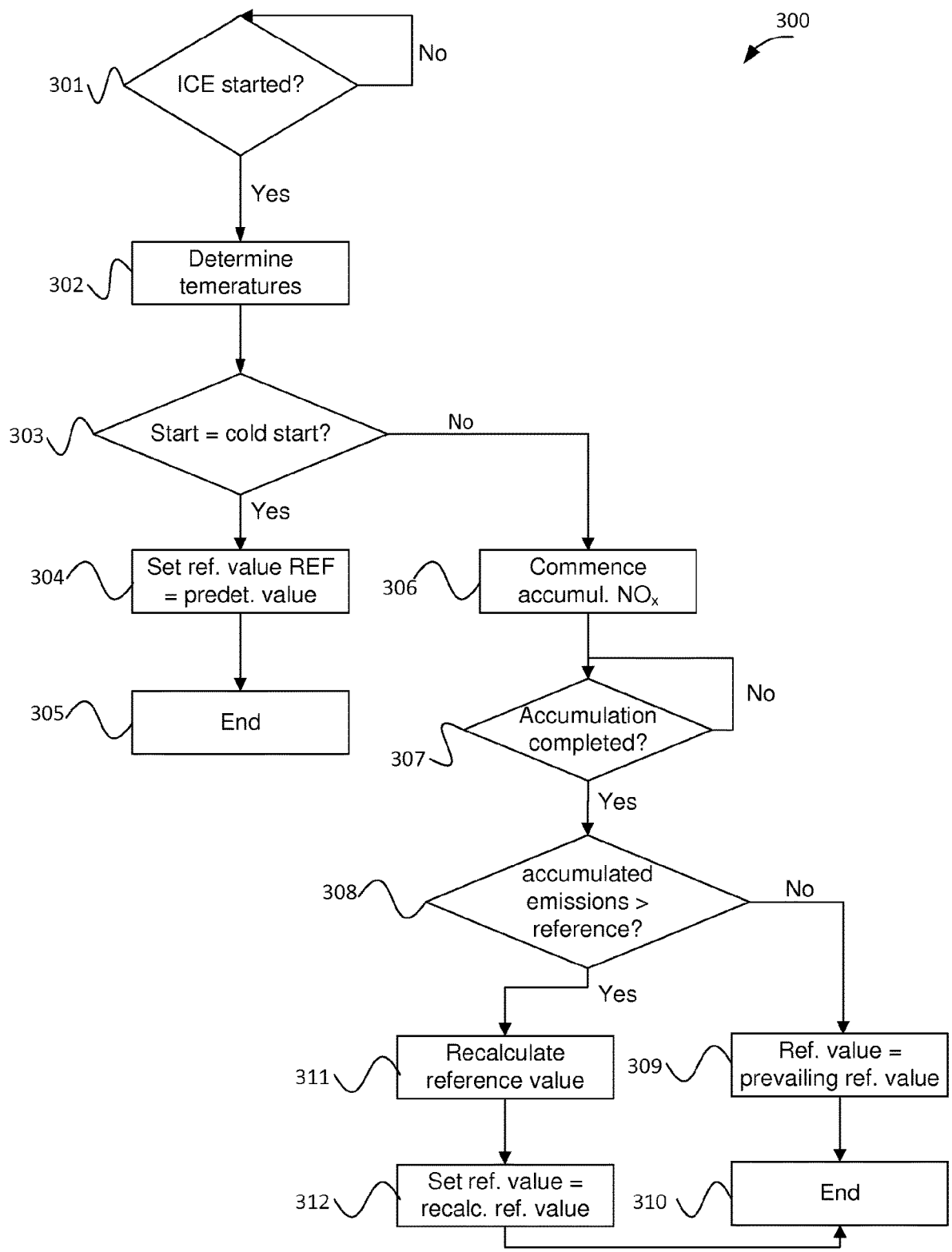
FIG. 3 illustrates an exemplary method according to embodiments of the invention.

Returning to the exemplary method 300 illustrated in FIG. 3, the method starts in step 301, where it is determined whether the internal combustion engine 101 is about to be, or has been, started. The method remains in step 301 for as long as this is not the case. The method continues to step 302 when it is determined that the internal combustion engine is being started and/or has been started.

In step 302 one or more temperatures representing a temperature of the internal combustion engine 101 are determined. For example, one or more temperatures representing the current internal combustion engine 101 temperature may be determined. Such one or more temperatures may, for example, constitute a cooling fluid temperature or any other suitable temperature that may represent the prevailing temperature of the internal combustion engine 101, such as an engine block temperature or any other temperature that may be utilized to represent the current internal combustion engine temperature, or from which an internal combustion engine temperature can be determined e.g. through a model representation e.g. in the form of a mathematical relation linking engine temperature with one or more other temperatures. It is also contemplated that e.g. the temperature of one or more exhaust treatment components may be utilized in the determination of a representation of an engine temperature. Furthermore, for example, one or more temperatures representing the temperature of the surroundings in which the vehicle is currently located, such as surrounding air temperature may be determined.

The one or more temperatures may be determined, for example using suitable temperature sensors or may be determined in any other suitable manner, such as through the use of temperature models, which e.g. may take into account the time that has lapsed since the internal combustion engine was last running. Furthermore, with regard, for example, to ambient temperature, this may be determined in any suitable way such as using one or more sensors or e.g. may be received from metrological data regarding the area in which the vehicle is present.

In step 303 the one or more temperatures that has been determined in step 302 are evaluated in order to determine whether the start of the internal combustion engine 101 fulfils a criterion, which may be a criterion to determine whether to classify the start as a cold start or a start that is not to be classified as a cold start. For example, it may be determined whether the start of the internal combustion engine that has just been carried out or is just about to be carried out is to be classified as a cold start or another kind of start, such as a warm start.

With regard to the determination in step 303, this may be performed in various ways. For example, the temperature representing the temperature of the internal combustion engine 101 determined in step 302 may be compared with a temperature representing an ambient temperature of the vehicle surroundings. If, for example, the comparison reveals that the temperature difference between these temperatures is below a threshold difference, the start of the internal combustion engine 101 may be classified as a cold start. Conversely, if the temperature difference between the temperature of the internal combustion engine 101 and the ambient temperature exceeds the threshold, the start of the internal combustion engine 101 may be classified by this comparison as not being a cold start, for example, a warm start. However, as will be discussed below, the start of the internal combustion engine 101 may at a later stage be reclassified to a cold start depending on resulting emission levels following the start of the vehicle.

As an alternative to determining whether the start of the internal combustion engine 101 is doing a cold start based on a comparison with a representation of an ambient temperature, only a temperature representing a temperature of the internal combustion engine 101 may alternatively be used. This temperature may then be compared e.g. with a threshold temperature, where the start of the internal combustion engine may be classified as a cold start when the engine temperature is below this threshold. Correspondingly, the start of the internal combustion engine 101 may be classified as not being a cold start, such as a warm start, when the temperature exceeds this threshold.

If it is determined in step 303 that the internal combustion engine 101 is undergoing a cold start, the method continues to step 304. In step 304 the reference value $Em_{ref}$ regarding the emissions of, in this example, $NO_x$, leaving the vehicle and using which additive to be supplied to the SCR catalytic converter is controlled, is set to a predetermined value that represents low emissions, for example as low as possible emissions.

In general, with regard to a cold start, emissions are considerably higher than desired during a first period of time when the internal combustion engine and exhaust treatment components are being warmed up, and therefore the reference value $Em_{ref}$ may be set to a low value so that the system works towards lowering the emissions as the internal combustion engine and aftertreatment components get warmer.

The reference value $Em_{ref}$ may be sent e.g. on the basis of theoretical performance of the SCR catalytic converter, or on the basis of other criteria, such as requirements by law. The reference value $Em_{ref}$ may, for example, be set to a value that fulfils legislative requirements both with regard to emission levels and also with regard to weighted emissions when cold start performance and warm start performance are weighted together as is discussed below.

This reference value may be predetermined, e.g. during a design or manufacturing stage to be used in situations of this kind, and be stored as the reference value to be used until possibly being redetermined according to the below. Still, whenever the vehicle is deemed to perform a cold start in step 303, the reference value may be reset to this predetermined value. The method is then ended in step 305.

If, instead, it is determined in step 303 that the internal combustion engine 101 is not performing a cold start, for example because the current internal combustion engine 101 temperature exceeds a threshold according to the above, the method continues to step 306.

In step 306 and accumulation of the current emissions of the vehicle regarding the substance to be used, in this example $NO_x$, is commenced. This accumulation may be performed using signals from the $NO_x$ sensor 208. In addition, an estimation of the emissions may concurrently be carried out. This accumulation may be performed for a defined period, such as a predetermined period of time, or, alternatively or in addition, during a period being defined by the internal combustion engine 101 performing a certain amount of work, such as producing work corresponding to a certain number of kWh or similar. Hence the work being produced by the internal combustion engine 101 may be simultaneously accumulated, e.g. from amount of fuel being supplied to the combustion chambers/cylinders of the internal combustion engine 101. This however, is often already being performed by the vehicle control system, and the information may therefore already be available for use.

When it is determined in step 307 that the accumulation commenced in step 306 has been performed during the defined period, in the present example work corresponding to a certain amount of kWh being produced by the internal combustion engine 101, the method continues to step 308 where the accumulated emissions are compared with the current reference value and/or some other predetermined value. The emissions may be expressed as quantity per unit work of the internal combustion engine, such as emitted substance, e.g. in terms of grams or milligrams, per some amount of work being produced by the internal combustion engine 101, e.g. per kWh. The reference value that is used in the comparison may have been set as discussed above with reference to step 304, but may also previously have been set according to what is described below.

In step 308 it may be determined whether the accumulated emissions exceed the reference value by more than a predetermined difference, or simply exceeds the reference value. If this is the case, it may be determined that the start of the internal combustion engine 101 in fact should have been classified as a cold start in step 303 because of the elevated emission levels. This may be the case, for example, if the temperature of the internal combustion engine 101 when being started did not fulfil the criteria for being classified as a cold start according to the above, but where in reality the internal combustion engine 101 and other components, such as aftertreatment components, may have cooled down prior to the start to an extent that do give rise to undesirably elevated emissions.

If it is determined in step 308, on the basis of the comparison of the accumulated emissions with the current reference value, that the assumption in step 303 was correct, i.e. that the start of the internal combustion engine 101 is not to be classified as a cold start but e.g. a warm start since the emissions do not exceed the reference value, the start of the internal combustion engine 101 is determined to be a warm start and therefore no change of the reference value $Em_{ref}$ is to be made. That is, the already prevailing reference value $Em_{ref}$ determined according to step 304 above or step 311 below, is maintained, step 309, and the method is ended in step 310. Hence, according to the exemplified embodiment, the prevailing reference value is always maintained from the previous time the internal combustion engine was running when a warm start is performed. Since there is no change of the reference value in this case, the method may alternatively be ended directly from step 308.

If, on the other hand, the emissions are elevated according to the above, the method continues to step 311 where a new reference value $Em_{ref}$ is calculated based on the result of the accumulation commenced in step 306. The new reference value $Em_{ref}$ being calculated in step 311 it may be calculated to ensure that prevailing exhaust emission standards are fulfilled.

In dependence on the result of the accumulation commenced in step 306, the resulting reference value being calculated in step 311 may be higher than the reference value $Em_{ref}$ being set in step 304. This may be the case, for example, when the emissions during the accumulation are high, but are still lower than worst case accounted for in step 304. In this way, e.g. stress on the aftertreatment components may be reduced while still ensuring compliance with exhaust emission standards.

The newly determined reference value $Em_{ref}$ may then replace the presently prevailing reference value, step 312, to be used until again being redetermined in step 304 or 311 following a subsequent start of the internal combustion engine 101. The method may then be ended in step 310.

An exemplary manner of calculating a new reference value $Em_{ref}$ in step 311 will be exemplified in the following with reference to FIG. 4.

Figure 4:
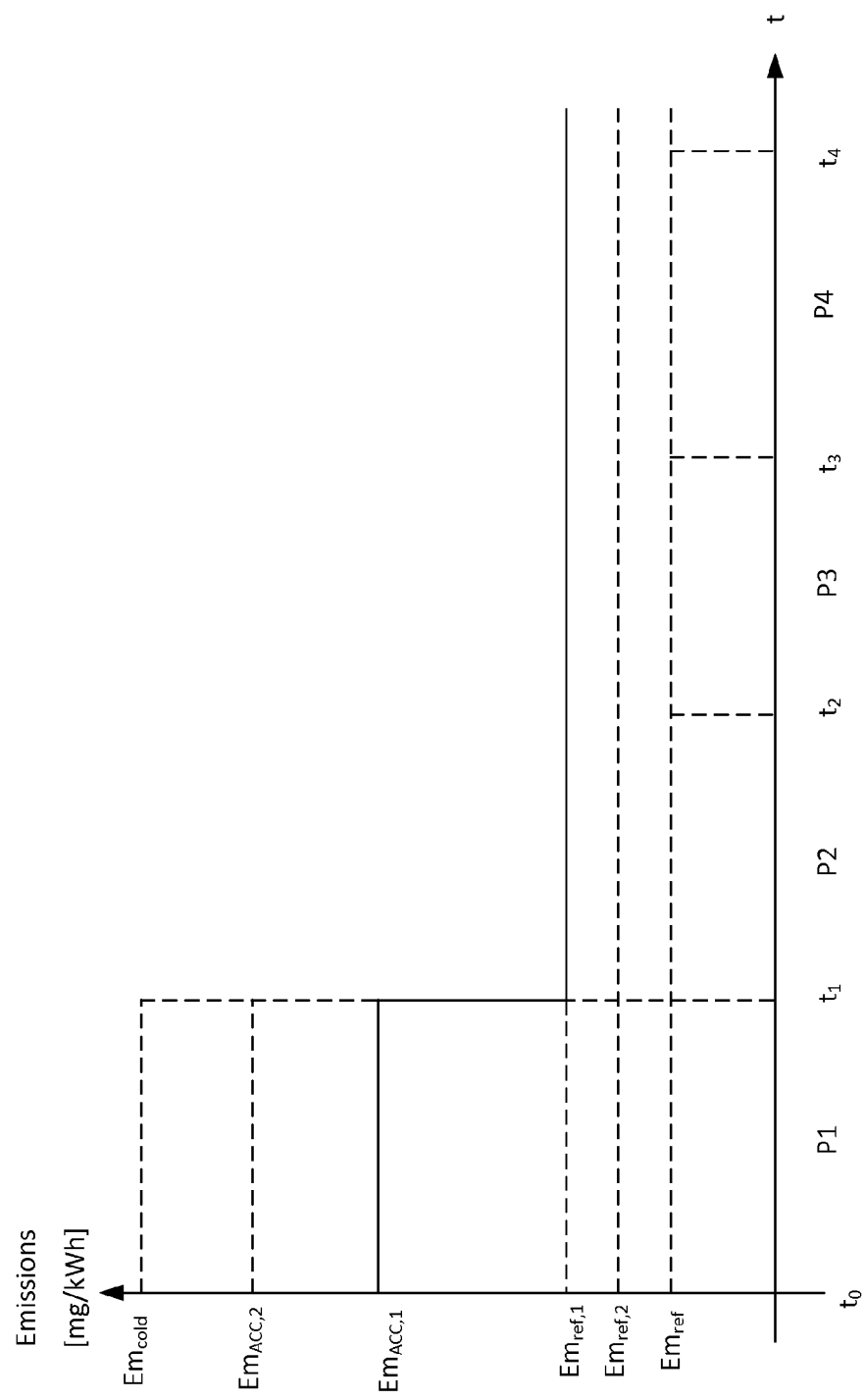
FIG. 4 illustrates variation of emissions as a function of time according to embodiments of the invention.

FIG. 4 illustrates an example of vehicle emissions over a number of consecutive accumulation periods, where the emissions are given as an average for each period for reasons of illustration. In reality, as has been explained, the emissions may vary substantially with time, but in FIG. 4 the emissions are exemplified as mean value for each period P1, P2, etc. Furthermore, the emissions are illustrated as milligrams substance discharged per kWh produced by the internal combustion engine 101. Furthermore, emissions may or may not be accumulated for other periods than period P1, but the further periods are disclosed since, as briefly discussed below, there may exist legislation that require measurements during a plurality of periods. In addition, the periods of FIG. 4 are illustrated as having the same length, but the periods may also have different length in time and e.g. comprise periods having a same amount of work being produced by the internal combustion engine.

With reference to FIG. 3 when it is determined in step 303 that the start of the internal combustion engine is not to be classified as a cold start, accumulation is commenced in step 306, time to in FIG. 4, to be ended at time ti when a predetermined time has lapsed, and/or a predetermined work has been produced by the internal combustion engine 101.

Since it has been determined in step 303 that the start of the internal combustion engine is not a cold start, the expected mean emission level during the first period P1 following the start of the internal combustion engine is an emission level that equals or is below the current reference value $Em_{ref}$, i.e. that the emissions behave as if the vehicle is performing a warm start, i.e. the internal combustion engine and other components are essentially at normal operating temperature. According to the example, the prevailing reference value is $Em_{ref}$ and may be the predetermined reference value that has been determined to be used in a cold start of the vehicle.

However, according to the present example, by following the accumulation during period P1, it is concluded that the actual emissions during the period P1 has been a level $Em_{ACC,1}$, which is a level of emissions considerably higher than the reference level of emissions $Em_{ref}$. Still the emission level is lower than the level $Em_{cold}$ that may prevail during a cold start, and which may the level used to determine $Em_{ref}$. Therefore, it is determined in step 308 that the start of the vehicle is not a warm start, and that therefore a redetermination of the reference value is to be performed. This determination may be performed in any suitable manner, but according to the invention this determination is performed according to the following.

Since the start of the vehicle, due to the high measured emissions during the period P1, it is determined to in fact be a cold start and not a warm start which, as explained above, may be the case in case criteria such as temperature criteria defining cold start are not fulfilled, but where in reality internal combustion engine and/or exhaust treatment components are of such low temperature that the start in fact should be treated as a cold start because of the elevated emissions.

With regard to legislative emissions requirements, these may be designed such that the allowed emission level is an emission level resulting from weighting cold start emissions and warm start emissions. The recalculation of the reference value in step 311 may be performed such that the emissions of vehicles fulfil legislative regulations at all times, and the below calculations may be appropriately amended if necessary to allow that the emissions comply with legislation in specific jurisdictions.

According to the present example, the following formula is utilized, which is used to comply with emission standards. For example according to such standards, when determining exhaust emission levels, it may be required that two test cycles are performed, one where the vehicle is performing a cold start, to be followed by a second test cycle, where the vehicle performs a warm start within a first period of time from the end of the first test cycle, such as e.g. with a 10 minute period with the internal combustion engine turned off between the test cycles. The weighted emissions must then fulfil set requirements. According to the invention, it may be ensured that such requirements are fulfilled.

For example, the emissions that are to be below set limits may be calculated according to some weighting formula, and according to the present example, weighting according to eq. (1) is utilized, wherein for emissions during the cold start test cycle and the warm start test cycle the emissions are weighted according to:

$$Em_{weighted} = \frac{(Em_{cold} + 6 * Em_{warm})}{7} \quad (1)$$

where $Em_{cold}$ represents the emissions during the cold start test cycle, and $Em_{warm}$ represents the emissions during the warm start test cycle.

The weight factors are used in order to mirror the general case, where a vehicle, in particular heavy vehicles, is driven for considerably longer periods of time when being warm than when being cold. The exemplified weights comply, for example, with European EU6 standards.

With regard to eq. (1) there are hence legislative maximum limits of $Em_{weighted}$. According to embodiments of the invention, instead of using the legislative upper value, a limit being lower than $Em_{weighted}$ is used, denoted $Em_{target}$ in the following. For example, vehicle manufacturers may use lower emission limits to account for tolerances and sensitivity in sensors, so that the legislative requirements still can be fulfilled. Also, e.g. manufacturing tolerances and differences between individual engines and other components may be accounted for in this manner. The vehicle manufacturer may e.g. also have internal emission goals which are more strict than legislatively allowable limits.

Using eq. (1) and substituting the weighted emissions $Em_{weighted}$ for the target emissions $Em_{target}$, a limit for warm system operation, i.e. $Em_{warm}$ which hence will also become the reference value can be determined as:

$$Em_{ref} = Em_{warm} = \frac{\left(Em_{target} - \frac{1}{7} * Em_{ACC}\right)}{6/7} \quad (2)$$

where $Em_{ACC}$ hence represents the emissions that is measured during the accumulation in step 306, and is used as the cold start emissions.

The reference value being determined in step 312 hence depends on the target emission value and the emissions determined in the accumulation of step 306.

With reference to FIG. 4, assuming a target value $Em_{target}$, which may be set according to criteria stated above, and the resulting cold start emissions in period P1 being $Em_{ACC,1}$, this would according to the present example result in a reference value $Em_{ref}$, according to eq. (2). This value may then be used as reference value for periods P2, P3, etc., and for the following starts of the vehicle for as long as these are warm starts.

The invention has the advantage that the reference value $Em_{ref}$ can be adapted to account for currently prevailing conditions.

If, instead, the cold start emissions had been $Em_{ACC,2}$, which still is lower than the level $Em_{cold}$, the resulting reference value determined using eq. 2 would, according to the present example, instead, be $Em_{ref,2}$, which is lower than the value $Em_{ref,1}$ but still higher than $Em_{ref}$.

The invention has advantages over a method where, during a design/manufacturing phase, cold start emissions are determined in a test cell, and where the reference (target) value is set to a static value based on this comparison.

As was mentioned emissions are higher during a cold start before the aftertreatment system has reached optimal temperature. This means that the emissions for the rest of this driving cycle must be kept so low that the weighted emissions (cold/warm) fulfil legislation. According to the invention this can be ensured by setting a reference value that always fulfil requirements regarding weighted emissions.

On the other hand, if the engine is started semi-cold, the initial emissions are lower than during a real cold start. In this case the emissions during the rest of the driving cycle may be allowed to differ from the real cold start case and still yield the same weighted cold/warm emissions. This may have advantages, for example, that stress on the aftertreatment system may be reduced.

Furthermore, with regard to emission control requirements, it is with regard to at least heavy/commercial vehicles often not sufficient that the emission requirements are fulfilled during controlled testing, but also that the emissions are controlled by onboard diagnostics, and this may hence be carried out according to the invention.

In addition, with regard to, for example, Eu6, there are also requirements that the $NO_x$ emissions from a plurality of (at least 3) repeated warm cycles/periods must not differ more than 25%. This may not always be trivial to fulfil, but will be fulfilled according to the invention, since the same reference value will be used for as long as the starts of the internal combustion engine are deemed to be warm starts, and hence for all periods P2, P3, P4 in FIG. 4. The use of the same reference value is a control that will reduce variations between periods as much as possible.

With regard to the estimation of the emissions, as was mentioned, when calculating a reference value according to embodiments of the invention, the estimated actual $NO_x$ emissions may often already be present by already being calculated by the engine management system. It is also to be noted that also in situations where a $NO_x$ sensor is used to determine the emissions, which may be both upstream and downstream of the supply of additive, an estimation may also be performed using a mathematical model to validate the sensor measurements, and also be used instead of the sensor e.g. immediately following a cold start where the sensors e.g. may be subjected to moist and therefore not be delivering reliable measurements.

The invention has been described for particular embodiments above, but various alternatives are contemplated. For example, the invention may also be utilized when it is determined that the vehicle performs a cold start, i.e. that the exemplified calculations and accumulation are performed also when it is determined in step 303 that the vehicle performs a cold start and that therefore the reference value is always determined on a dynamic basis.

Furthermore, according to the embodiments discussed in connection with the drawings, the exhaust treatment system 130 shown in FIG. 2 comprises an SCR catalytic converter 201. As discussed above, the exhaust treatment system may, however, be of various designs comprising further/other components for as long as additive is supplied to the exhaust gas stream. For example, an aftertreatment system may comprise further components such as one or more particle filters, one or more oxidation catalytic converters, as is known per se. It is also contemplated that the aftertreatment system may comprise more than one SCR catalytic converter. For example, a further SCR catalytic converter or other reduction catalytic converter can be arranged upstream of the oxidation catalytic converter Finally, the present invention has been exemplified for a vehicle. The invention is, however, applicable in any kind of craft, such as, e.g., aircrafts and watercrafts. The invention is also applicable for use in combustion plants.

The invention claimed is:

1. A method for determining a reference value of a presence of at least one NOx substance in an exhaust gas stream of an internal combustion engine comprising:
   subjecting the at least one NOx substance to an exhaust gas treatment in the exhaust gas stream, and carrying out the exhaust gas treatment in dependence on the reference value,
   the method further comprising, when the internal combustion engine is started:
   accumulating emissions of the at least one NOx substance downstream of the exhaust treatment during a first period of time,
   determining whether to recalculate the reference value based on the accumulated emissions of the at least one NOx substance being compared with a predetermined limit value, wherein the reference value represents the emissions of the at least one NOx substance that leave following the exhaust gas treatment,
   subjecting the at least one NOx substance to exhaust gas treatment by an exhaust gas recirculation,
   carrying out the exhaust gas treatment in dependence on the reference value by controlling the exhaust gas recirculation in dependence on the reference value, and
   accumulating the emissions of the at least one NOx substance downstream a point where at least part of the exhaust gas is diverted for recirculation.

2. The method according to claim 1, further comprising:
   subjecting the at least one NOx substance to exhaust gas treatment by supplying additive to the exhaust gas stream for reducing the at least one NOx substance;
   carrying out the exhaust gas treatment in dependence on the reference value by supplying the additive in dependence on the reference value; and
   accumulating the emissions of the at least one NOx substance downstream of the supply of the additive.

3. The method according to claim 1, further comprising:
   recalculating the reference value when the accumulated emissions of the at least one NOx substance exceeds the predetermined limit value.

4. The method according to claim 1, further comprising:
   starting the internal combustion engine and determining whether the start of the internal combustion engine fulfills a first criterion,
   determining whether to commence the accumulation based on whether the starting of the internal combustion engine fulfils the first criterion.

5. The method according to claim 1, further comprising, when the internal combustion engine is started:
   determining a representation of a first temperature of the internal combustion engine; and
   determining whether to commence the accumulation based on the first temperature.

6. The method according to claim 5, further comprising:
   determining whether the first temperature exceeds a first temperature limit; and
   commencing the accumulation when the first temperature exceeds the first temperature limit.

7. The method according to claim 5, further comprising:
   determining a representation of an ambient temperature of the internal combustion engine; and
   determining whether to commence the accumulation based also on the representation of the ambient temperature.

8. The method according to claim 7, further comprising:
   comparing the first temperature of the internal combustion engine with the ambient temperature, and
   determining whether to commence the accumulation based on the comparison.

9. The method according to claim 1, further comprising:
   recalculating the reference value based on the accumulated emissions of the at least one NOx substance and a target value which is determined by a weighting of the accumulated NOx emissions and the reference value such that a higher weight is assigned to the reference value in comparison to the weight of the accumulated NOx emissions.

10. The method according to claim 1, further comprising:
    commencing the accumulation of the at least one NOx substance within the first period of time from when the internal combustion engine has been started.

11. A computer program comprising instructions which, when the program is executed in a computer, it causes the computer to carry out the method according to claim 1.

12. A non-volatile computer-readable medium comprising instructions, wherein when the instructions are executed in a computer, it causes the computer to carry out the method according to claim 1.

* * * * *